US011657289B2

(12) United States Patent
Zhou et al.

(10) Patent No.: US 11,657,289 B2
(45) Date of Patent: May 23, 2023

(54) COMPUTATIONAL GRAPH OPTIMIZATION

(71) Applicant: Google LLC, Mountain View, CA (US)

(72) Inventors: Yanqi Zhou, Sunnyvale, CA (US);
Sudip Roy, San Jose, CA (US);
Amirali Abdolrashidi, Riverside, CA (US); Daniel Lin-Kit Wong, Pittsburgh, PA (US); Chao Ma, Mountain View, CA (US); Qiumin Xu, Santa Clara, CA (US); Azalia Mirhoseini, San Jose, CA (US)

(73) Assignee: Google LLC, Mountain View, CA (US)

( * ) Notice: Subject to any disclaimer, the term of this patent is extended or adjusted under 35 U.S.C. 154(b) by 404 days.

(21) Appl. No.: 16/840,191

(22) Filed: Apr. 3, 2020

(65) Prior Publication Data
US 2021/0248445 A1    Aug. 12, 2021

Related U.S. Application Data

(60) Provisional application No. 62/971,891, filed on Feb. 7, 2020.

(51) Int. Cl.
*G06N 3/04* (2023.01)
*G06K 9/62* (2022.01)
*G06N 3/049* (2023.01)

(52) U.S. Cl.
CPC ......... *G06N 3/0454* (2013.01); *G06K 9/6231* (2013.01); *G06K 9/6262* (2013.01); *G06K 9/6296* (2013.01); *G06N 3/049* (2013.01)

(58) Field of Classification Search
CPC .... G06N 3/0454; G06N 3/049; G06K 9/6231; G06K 9/6262; G06K 9/6296
See application file for complete search history.

(56) References Cited

U.S. PATENT DOCUMENTS

2019/0026624 A1\* 1/2019 Steiner .................. G06N 3/084
2020/0249998 A1\* 8/2020 Che ...................... G06N 3/0454
2022/0067115 A1\* 3/2022 Zheng ...................... G06N 5/02

FOREIGN PATENT DOCUMENTS

WO    WO 2019/018332    1/2019

OTHER PUBLICATIONS

Addanki et al. "Placeto: Learning generalized device placement algorithms for distributed machine learning," arXiv 1906.08879, Jun. 20, 2019, 15 pages.

(Continued)

*Primary Examiner* — Fayyaz Alam
(74) *Attorney, Agent, or Firm* — Fish & Richardson P.C.

(57) ABSTRACT

Methods, systems, and apparatus, including computer programs encoded on computer storage media, for optimizing the execution of the operations of a neural network. One of the methods includes obtaining data representing a graph characterizing a plurality of operations of a neural network, wherein each node of the graph characterizes an operation of the neural network and each edge of the graph characterizes data dependency between the operations; processing the data representing the graph using a graph embedding neural network to generate an embedding of the graph; and processing the embedding of the graph using a policy neural network to generate a task output, wherein the task output comprises, for each of the plurality of operations of the neural network, a respective decision for a particular optimization task.

24 Claims, 5 Drawing Sheets

(56) References Cited

OTHER PUBLICATIONS

Adams et al. "Learning to optimize halide with tree search and random programs," ACM Transactions on Graphics 38(4), Jul. 12, 2019, 13 pages.
Ba et al. "Layer normalization," arXiv 1607.06450v1, Jul. 21, 2016, 14 pages.
Bahdanau et al. "Neural machine translation by jointly learning to align and translate," arXiv 1409.0473v7, May 19, 2016, 15 pages.
Chen et al. "Learning to optimize tensor programs," arXiv 1805.08166v4, Jan. 8, 2019, 16 pages.
Chen et al. "Learning to perform local rewriting for combinatorial optimization," arXiv 1810.00337v5, Oct. 30, 2019, 20 pages.
Cheung et al. "Superposition of many models into one," arXiv 1902.05522v2, Jun. 17, 2019, 18 pages.
zihangdai.github.io [online] "Curriculum Vitae of Zihang Dai," available on or before Sep. 10, 2016, [retrieved on Aug. 5, 2020] Retrieved from Internet:<https://zihangdai.github.io/>, 3 pages.
Dai et al. "Transformer-XL: Attentive language models beyond a fixed-length context," arXiv 1901.02860v3, 20 pages.
Devlin et al. "BERT: pre-training of deep bidirectional transformers for language understanding," arXiv 1810.04805v2, May 24, 2019, 16 pages.
Gao et al. "Spotlight: Optimizing device placement for training deep neural networks," Proceedings of the 35th International Conference on Machine Learning, Jul. 3, 2018, 9 pages.
tensorflow.org [online] "XLA: Optimizing Compiler for Machine Learning," Available on or before Nov. 5, 2018, [Retrieved on Aug. 5, 2020] Retrieved from internet:<https://tensorflow.org/xla> 6 pages.
Hamilton et al. "Inductive representation learning on large graphs," arXiv v4, Sep. 10, 2018, 19 pages.
Hestness et al. "Deep learning scaling is predictable," arXiv 1712.00409, Dec. 1, 2017, 19 pages.
Huang et al. "Gpipe: Efficient training of giant neural networks using pipeline parallelism," arXiv 1811.06965v5, Jul. 25, 2019, 11 pages.
Jia et al. "Beyond data and model parallelism for deep neural networks," arXiv 1807.05358v1, Jul. 14, 2018, 15 pages.
Jozefowicz et al. "Exploring the limits of language modeling" arXiv 1602.02410v2, Feb. 11, 2016, 11 pages.
Karypis et al. "A fast and high quality multilevel scheme for partitioning irregular graphs," SIAM J. Sci. Comput. (20(1) Dec. 1998, 28 pages.
Lattner et al. "MLIR primer: A compiler infrastructure for the end of moore's law," Compilers for Machine Learning Workshop, CGO, [retrieved on Aug. 5, 2020] Retrieved from internet:<https://storage.googleapis.com/pub-tools-public-publication-data/pdf/1c082b766d8e14b54e36e37c9fc3ebbe8b4a72dd.pdf> available on or before Dec. 22, 2019, 45 pages.
Mahajan et al. "Exploring the limits of weakly supervised pretraining," Proceedings of the European Conference on Computer Vision, Sep. 2018, 16 pages.
Mirhoseini et al. "Device placement optimization with reinforcement learning," arXiv 1706.04972v2, Jun. 25, 2017, 11 pages.
Mirhoseini et al. "A hierarchical model for device placement," ICLR, Feb. 15, 2018, 11 pages.
Narayanan et al. "Pipedream: Generalized pipeline parallelism for dim training," Proceedings of the 27th ACM Symposium on Operating Systems Principles, Oct. 27, 2019, 15 pages.
Paliwal et al. "Regal: transfer learning for fast optimization of computation graphs," arXiv 1905.02494v4, Feb. 10, 2010, 24 pages.
Radford et al. "Language models are unsupervised multitask learning," OpenAI Blog 1(8), Feb. 24, 2019, 24 pages.
Real et al. "Regularized evolution for image classifier architecture search," arXiv 1802.01548v7, Feb. 16, 2019, 16 pages.
Rotem et al. "Glow: Graph lowering compiler techniques for neural networks," arXiv 1805.00907v3, Apr. 3, 2019, 12 pages.
Schulman et al. "Proximal policy optimization algorithms" arXiv 1707.06347 v2, Aug. 28, 2017, 12 pages.
Sutskever et al. "Sequence to sequence learning with neural networks," arXiv 1409.3215v3, Dec. 14, 2014, 9 pages.
Shazeer et al. "Outrageously large neural networks: The sparely-gated mixture-of-experts layer," arXiv 1701.06538S, Jan. 23, 2017, 19 pages.
Szegedy et al. "Rethinking the inception architecture for computer vision," arXiv 1512.00567v3, Dec. 11, 2015, 10 pages.
Van den Oord et al. "Wavenet: A generative model for raw audio," arXiv 1609.03499v2, Sep. 19, 2016, 15 pages.
Vaswani et al. "Attention is all you need," NIPS, Dec. 2017, 11 pages.
Wu et al. "Googles neural machine translation system: Bridging the gap between human and machine translation," arXiv 1609.08144v2, Oct. 8, 2016, 23 pages.
Xu et al. "How powerful are graph neural networks," arXiv 1806.02473v3, Feb. 25, 2019, 12 pages.
Yuu et al. "Knossos: Compiling ai with ai," Under review as a conference paper at ICLR 2020, 23 pages.
Zaremba et al. "Recurrent neural network regularization," arXiv 1409.2329v5, Feb. 19, 2015, 8 pages.
Zhihao et al. "TASO: optimizing deep learning computation with automatic generation of graph substitutions," ACM Symposium on Operating Systems Principles, Oct. 27, 2019, 16 pages.
Dai et al, "Transformer-XL: Attentive Language Models beyond a Fixed-Length Context" arXiv, Jun. 2019, 20 pages.
PCT International Search Report and Written Opinion in International Application No. PCT/US2020/055848, dated Mar. 3, 2021, 16 pages.
Zhou et al, "GDP: Generalized Device Placement for Dataflow Graphs" arXiv, Sep. 2019, 11 pages.
International Preliminary Report on Patentability in International Appln. No. PCT/US2020/055848, dated Jul. 28, 2022, 9 pages.

* cited by examiner

COMPUTATIONAL GRAPH OPTIMIZATION

CROSS-REFERENCE TO RELATED APPLICATION

This application claims priority to U.S. Provisional Application No. 62/971,891, filed on Feb. 7, 2020. The disclosure of the prior application is considered part of and is incorporated by reference in the disclosure of this application.

BACKGROUND

This specification relates to processing computational graphs using neural networks.

Neural networks are machine learning models that employ one or more layers of nonlinear units to predict an output for a received input. Some neural networks include one or more hidden layers in addition to an output layer. The output of each hidden layer is used as input to or more other layers in the network, i.e., one or more other hidden layers, the output layer, or both.

SUMMARY

This specification describes a system implemented as computer programs on one or more computers in one or more locations that receives as input data characterizing a neural network and generates an execution optimization policy for optimizing the execution of the operations of the neural network on one or more processing devices. In this specification, an "execution optimization policy" for a neural network is data specifying, for each operation of the neural network, a respective decision for each of one or more different execution optimization tasks.

The system can represent the neural network using a computational graph (also called, for simplicity, a "graph") that includes nodes, at least some of which are connected by edges. Each node of the graph represents an operation of the neural network, and each edge of the graph represents a data dependency between operations of the neural network. Using the graph, the system can generate the execution optimization policy for the neural network. The one or more processing devices can then use the decisions for each execution optimization task to execute the operations of the neural network.

The subject matter described in this specification can be implemented in particular embodiments so as to realize one or more of the following advantages.

Techniques described in this specification allow for optimizing the execution of the operations of a neural network by generating a policy for one or more execution optimization tasks. Some policy generation systems described in this specification can be trained so that they are invariant to the underlying topology of the graph, and therefore can generate policies for a wide set of input graphs. Thus, the architecture can generalize well to previously-unseen graphs.

Some techniques described in this specification allow for generating a policy for multiple different execution optimization tasks at once. Because graph execution optimization problems can be strongly coupled, jointly optimizing for multiple different execution optimization tasks can lead to solutions that improve the runtime and device utilization of the execution of the neural network.

Some existing systems rely on hand-tuned heuristics in order to optimize the execution of a particular neural network. These hand-tuned heuristics can be device-specific, and so cannot be generalized to other devices. Further, the heuristics need to be constantly modified and fine-tuned using expert domain knowledge to accommodate new cases arising from previously unseen model architectures. Techniques described in this specification are flexible to a wide range of devices and model architectures, including architectures that were not encountered during training of the neural networks.

Some existing systems aim to learn execution optimization policies for executing the operations of a single particular neural network. That is, the existing systems are re-trained for each individual neural network, and the trained parameters of the existing systems are not transferrable to generating policies for other neural networks. Using techniques described in this specification, a policy generation system can be trained to generate execution optimization policies for a wide variety of different neural networks. These techniques can be applied to computational graphs that have drastically different architectures. Furthermore, these techniques can allow for generating execution optimization policies for graphs of realistically-sized workloads, e.g., graphs with over 1M or 10M nodes.

Some existing techniques that aim to learn execution optimization policies for executing the operations of a neural network are computationally expensive, e.g., by generating decisions for a single node per iteration of a neural network. A system as described in this specification can generate an execution optimization policy for a particular neural network in a single-shot fashion, drastically reducing the time required to generate such an execution optimization policy.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
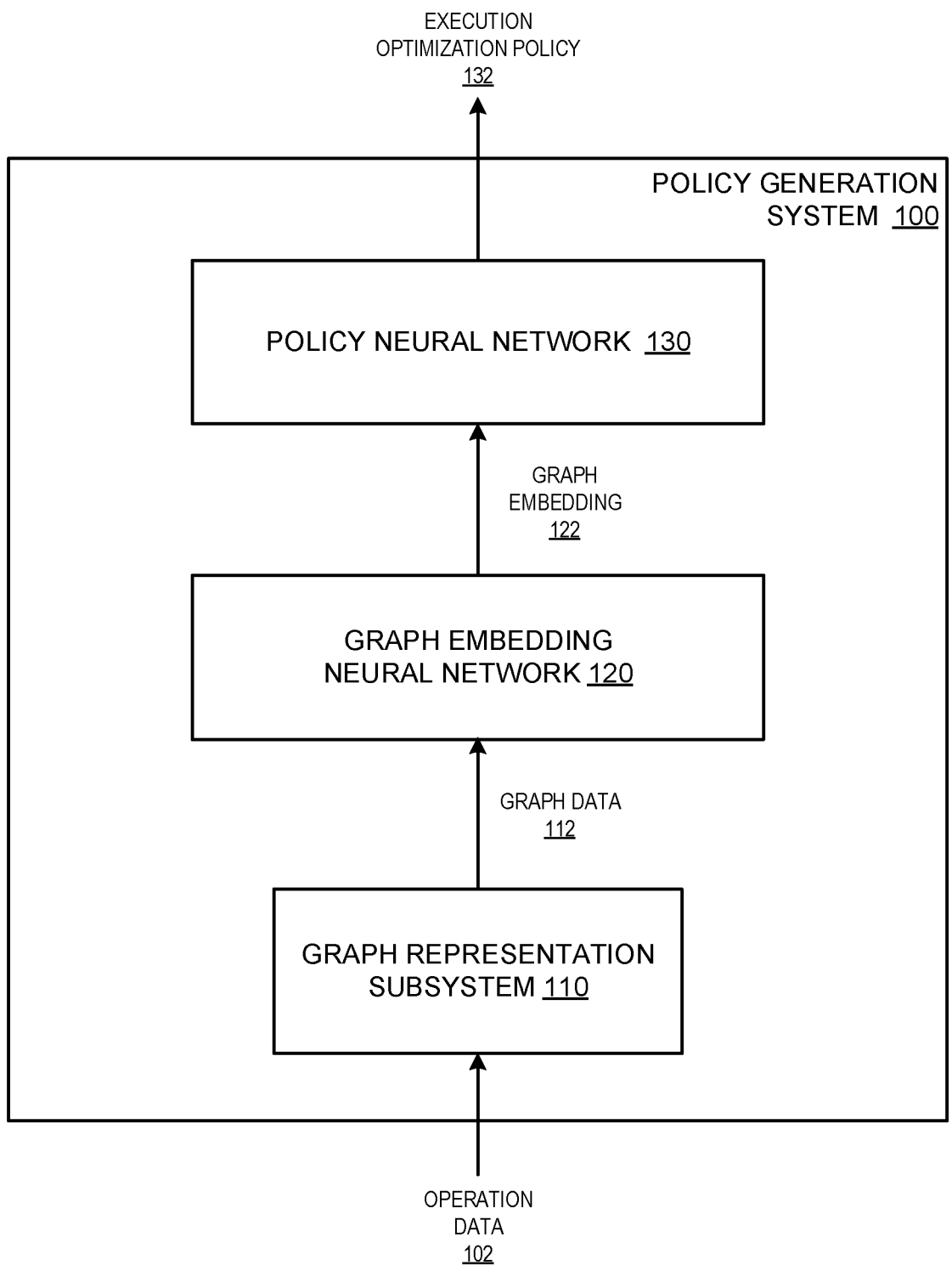
FIG. 1 is a diagram of an example policy generation system.

This specification describes a system that generates an execution optimization policy for optimizing the execution of the operations of a neural network on one or more processing devices. The operations of the neural network can include operations of the neural network that are executed by one or more processing devices during training of the neural network. Instead or in addition, the operations of the neural network can include operations of the neural network that are executed by one or more processing devices during inference time after the neural network has been trained. The system can generate a task output for each of one or more execution optimization tasks. The task output for a particular execution optimization task can include, for each operation of the neural network, a respective decision for the particular execution optimization task.

The system can represent the operations of the neural network as a computational graph, where each node of the graph represents an operation of the neural network, and each edge of the graph represents a data dependency between the operations of the neural network.

For example, one of the execution optimization tasks can be device placement, where each operation of the neural network is assigned to be executed on a particular one of multiple processing devices. The devices can include any appropriate types of computer hardware devices, i.e., any devices that are able to perform at least some of the operations represented in the computational graph. In some implementations, the devices are heterogeneous. For example, the devices can include a combination of any of, central processing units (CPUs), graphics processing units (GPUs), tensor processing units (TPUs), other application-specific integrated circuits (ASICs) or other special-purpose hardware, field-programmable gate arrays (FPGAs), and so on. In some other implementations, the devices are homogenous, i.e., only include devices of the same device type, i.e., only devices of one of the types above or only devices that are made up of the same combination of devices of the types above. Thus, the task output for this execution optimization task is an identification, for each node of the computational graph, of a particular processing device to which the operation represented by the node is assigned, e.g., a one-hot encoding that identifies a processing device.

As another example, one of the execution optimization tasks can be operation scheduling, where the system generates a schedule for the execution of the operations of the neural network. As a particular example, the system can use a priority-based scheduler, where each operation assigned to a particular device is put in a priority queue when the operation is ready to be executed (i.e., when all of the inputs to the operation are available). Here, the task output for this execution optimization task can be an identification of a priority value for each operation of the neural network, e.g., a one-hot encoding that identifies the priority value. The respective priority value for each operation of the neural network can then be used by the processing device assigned to execute the operation when pushing and popping operations from the priority queue.

As another example, one of the execution optimization tasks can be operation fusion, where multiple operations of the neural network are merged so that the processing device assigned to execute the multiple operations treats the multiple operations as a single operation. Operation fusion can be useful, for example, when the output of a first operation is the input to a second operation. In this case, if the processing device treats the two operations as a single operation, then the device does not need to write the output of the first operation to memory and later, when the device is executing the second operation, read the output back from memory. Thus, the task output for this execution optimization task can be identifications of two or more nodes of the computational graph that are to be treated by the assigned processing device as a single operation.

These execution optimization tasks can each be strongly coupled, i.e., the decisions made for one execution optimization task can affect the optimal decision for another execution optimization task. As a particular example, if the system takes the decisions made during operation fusion into account when performing device placement, then the system can assign two operations which would be good candidates for fusion to the same device. As another particular example, if the system takes the decisions made during operation scheduling into account when performing device placement, then the system can evenly disperse the high-priority operations across all the devices, and evenly disperse the low-priority operations across all devices, leading to high device utilization. That is, when considering multiple different execution optimization tasks jointly, the system can leverage knowledge sharing across the multiple tasks to generate optimal task outputs for each of the multiple tasks.

FIG. 1 is a diagram of an example policy generation system 100. The policy generation system 100 is an example of a system implemented as computer programs on one or more computers in one or more locations, in which the systems, components, and techniques described below can be implemented.

The policy generation system 100 can receive operation data 102 characterizing the operations of a neural network and process the operation data 102 to generate an execution optimization policy 132 that includes, for each operation of the neural network, a respective decision for each of one or more execution optimization tasks.

The policy generation system 100 can include a graph representation subsystem 110, a graph embedding neural network 120, and a policy neural network 130.

The graph representation subsystem 110 can receive as input the operation data 102. For example, the operation data 102 can include data characterizing, for each operation of the neural network, i) a type of the operation, ii) a list of other computations of the neural network whose outputs are inputs to the operation, iii) a list of other operations of the neural network that take the output of the operation as input, and iv) a shape of the output of the operation. The shape of an output of an operation can be a dimensionality of an output tensor of the operation, e.g., data specifying that the output tensor has a dimensionality of 10×20×5 elements.

The graph representation subsystem 110 can process the operation data 102 to generate graph data 112 that represents a graph characterizing the operations of the neural network. The graph includes multiple nodes, at least some of which are connected by edges. Each node of the graph can characterize a different operation of the neural network, and each edge of the graph can characterize a data dependency between respective operations. That is, if the output of a first operations of the neural network is an input to a second operation of the neural network, then there can be an edge between a first node of the graph that represents the first operation and a second node of the graph that represents the second operation. In some implementations, the graph is a directed graph; that is, each edge of the graph has a direction associated with it, so that one incident node of the edge is the source and the other incident node of the edge is the sink. In some other implementations, the graph is an undirected graph, where each edge does not have a direction associated with it.

Each node of the graph can be represented in the graph data 112 by an initial node embedding. In some implementations, the initial node embedding for each node of the graph is a machine-learned embedding of the features of the corresponding operation, i.e., is generated by processing the features of the node using a machine learning model.

In some other implementations, the initial node embedding for each node of the graph is a combination of the features of the corresponding operation, as described in the operation data 102. For example, each initial node embedding can be a concatenation of i) an embedding of the type of the corresponding operation, ii) an identification of each neighboring node in the graph, and iii) an embedding of the shape of the output of the corresponding operation. The embedding of the type of the corresponding operation can be a one-hot encoding of the type of operation; that is, the embedding can have the same number of elements as the number of possible types of operations, where the element corresponding to the type of the corresponding operation is '1' and all other elements are '0.' The embedding of the shape of the output of the corresponding operation can have a respective element for each dimension of the output, e.g., three elements that correspond to the length, height, and depth of the output, respectively. The value in each element of the embedding of the shape of the output can be the size of the output in the corresponding dimension, e.g., the embedding (10, 5, 3) might indicate that the output is 10 elements in length, 5 elements in height, and 3 elements in depth. In some implementations, the identification of each neighboring node of a particular node can be an embedding that includes an element corresponding to each node in the graph, where each element is '1' if the corresponding node is a neighboring node of the particular node and a '0' if the corresponding node is not a neighboring node of the particular node. In some other implementations, the identification of each neighboring node of a particular node can be a list of integers, where each integer corresponds to a particular neighboring node in the graph. In some such implementations, the graph representation subsystem 110 enforces a fixed upper bound on the number of neighboring nodes for each node, to ensure that each initial node embedding is fixed-length.

In this specification, an embedding is an ordered collection of numeric values that represents an input in a particular embedding space. For example, the embedding can be a vector of floating point or other numeric values that has a fixed dimensionality.

The graph data can also include an adjacency matrix of the nodes for the graph. An adjacency matrix for a graph of n nodes is an n×n matrix where the $(i,j)^{th}$ element is a 1 if there is an edge between node i and node j and a 0 otherwise.

The graph embedding neural network 120 can take the graph data 112 as input. In some implementations, the policy generation system 100 can receive the graph data 112 as input instead of the operation data 102; that is, in some implementations, the policy generation system 100 does not include the graph representation subsystem 110.

The graph embedding neural network 120 can process the graph data 112 to generate an embedding 122 of the graph. The graph embedding 122 can have n elements, where each element is an updated node embedding for a node of the graph. For example, the graph embedding 122 can be a matrix with n rows, where each row is the updated node embedding of a corresponding node of the graph.

In some such implementations, the graph embedding neural network 120 can generate the updated embedding for each node of the graph across multiple embedding time steps. That is, at each embedding time step, the graph embedding neural network 120 generates, for each node of the graph, a new embedding for the node by processing the embeddings of the nodes of the graph generated in the previous embedding time step. In the first embedding time step, the graph embedding neural network 120 can generate new node embeddings by processing the initial node embeddings in the graph data 112.

At a given embedding time step, the graph embedding neural network 120 can first generate, for each node of the graph, a neighborhood embedding of the node that characterizes the neighbors of the node. A first node is a neighbor of a second node if the two nodes are connected by an edge. In some implementations, the graph embedding neural network 120 can compute an average of the embeddings of the neighboring nodes generated in the previous embedding time step. In some other implementations, the graph embedding neural network 120 can process the embeddings of the neighboring nodes generated in the previous embedding time step using a combining neural network. As a particular example, the graph embedding neural network 120 can compute, for each node v, a neighborhood embedding $h_{\mathcal{N}(v)}$:

$$h_{\mathcal{N}(v)}^{(l)} = \max(\sigma(W^{(l)} h_u^{(l)} + b^{(l)}), \forall u \in \mathcal{N}(v)),$$

where $h_u^{(l)}$ is the embedding for a neighboring node of v generated in the previous embedding time step, N(v) is the set of neighboring nodes of v, $(W^{(l)}, b^{(l)})$ defines an affine transformation, σ is the sigmoid activation function, and max is a max pooling layer.

The graph embedding neural network 120 can then combine, for each node of the graph, i) the neighborhood embedding of the node and ii) the embedding of the node generated at the previous time step, to generate the new embedding of the node for the embedding time step. In some implementations, for each node of the graph, the graph embedding neural network 120 can concatenate the two embeddings to generate a combined embedding of the node. The graph embedding neural network 120 can then generate, for each node of the graph, a new embedding for the node by processing the combined embedding of the node, e.g., by processing the combined embedding of the node with one or more fully-connected neural network layers.

The graph embedding neural network 120 can provide the graph embedding 122 to the policy neural network 130. The policy neural network 130 can process the graph embedding 130 to generate the execution optimization policy 132. The execution optimization policy 132 can include a respective task output for each of the one or more execution optimization tasks. The task output for a particular execution optimization task includes, for each operation of the neural network, a decision for the particular execution optimization task.

In some implementations, the graph embedding neural network 120 and the policy neural network 130 can be trained jointly end-to-end to optimize a particular objective function. That is, a training system can backpropagate errors through each neural network, determining updates to the parameters of each neural network in parallel. In some other implementations, one of the neural networks can be "frozen" while training the other neural network. That is, the system does not determine updates to the parameters of the "frozen" neural network during backpropagation.

In some implementations, the training system can train the policy generation system 100 using an objective function that measures the performance of the execution of the operations of the neural network when the operations are executed according to the generated execution optimization policy 132. As particular examples, the training system can train the policy generation system 100 to minimize a measure of peak memory usage or a measure of average memory usage As another particular example, the training system can train the policy generation system 100 using an objective function that characterizes the expected runtime of the operations of a set of N candidate computational graphs. Each candidate computational graph represents a neural network whose operations might be optimized using the policy generation system 100. For example, the N candidate computational graphs can include a training set of computational graphs that is used during training of the policy generation system 100. Thus, by training the policy generation system 100 to minimize the objective function, the training system can train the policy generation system 100 to reduce the expected runtime of the operations of the N candidate graphs. In some such implementations, the system uses the following objective function J(θ).

$$J(\theta) = E_{G \sim \mathcal{G}, T \sim \pi_\theta(G)}[r_{G,T}] \approx \frac{1}{N} \sum_G E_{T \sim \pi_\theta(G)}[r_{G,T}],$$

where G is a candidate graph, $\mathcal{G}$ is the space of candidate graphs, T represents the task outputs generated by the policy generation system 100 for the one or more execution optimization tasks, $\pi_\theta(G)$ represents the policy for the candidate graph G generated using current parameter values θ of the parameters of the policy generation system 100, and $r_{G,T}$ is a reward that is a function of the runtime of the operations characterized by the candidate graph G using the task outputs T The training system can use the object function J(θ) to update the parameter values of the policy neural network 130 after generating the task outputs T for the one or more execution optimization tasks, and then backpropagate the update to the graph embedding neural network 120.

In some implementations, the training system can use Proximal Policy Optimization to optimize the objective function.

In some implementations, the training system can evaluate generated execution optimization policies on real systems, e.g., by executing the operations of the neural network on one or more real processing devices and measuring the runtime. Instead or in addition, the training system can process the task outputs generated by the policy generation system 100 using a model that estimates the runtime of the operations of the neural network.

Figure 2:
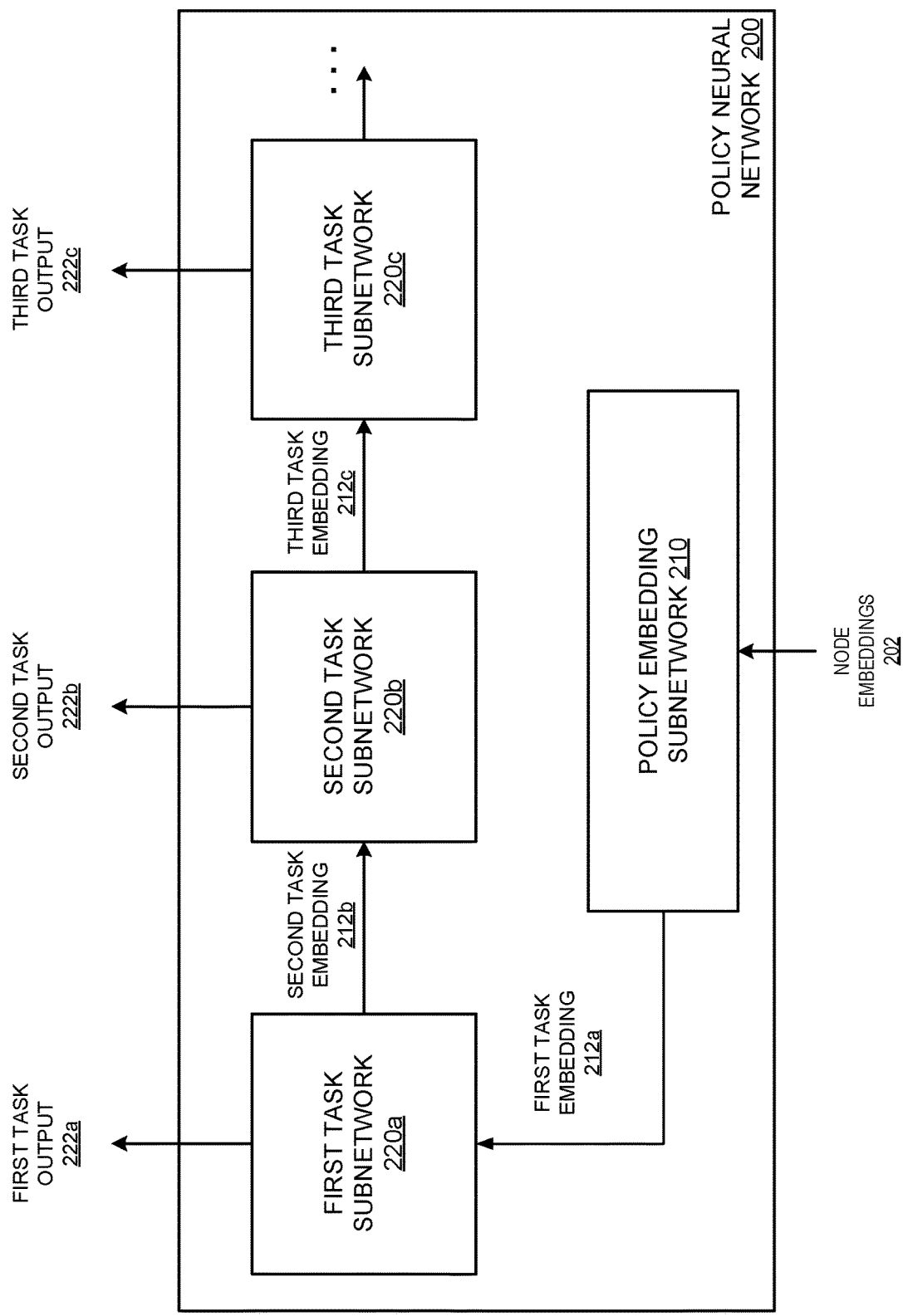
FIG. 2 is a diagram of an example policy neural network.

FIG. 2 is a diagram of an example policy neural network 200. The policy neural network 200 is an example of a system implemented as computer programs on one or more computers in one or more locations, in which the systems, components, and techniques described below can be implemented.

The policy neural network 200 receives as input node embeddings 202 for the nodes of a graph that represents the operations of the neural network, and generates a respective task output 222a-c for each of one or more execution optimization tasks. The node embeddings 202 might have been generated by a graph embedding neural network, e.g., the graph embedding neural network 120 depicted in FIG. 1.

The policy neural network 200 can include a policy embedding subnetwork 210 and a respective task subnetwork 220a-c for each of the one or more execution optimization tasks. The policy embedding subnetwork 210 can receive the node embeddings 202 and process the node embeddings 202 using one or more attention neural network layers, e.g., neural network layers that process inputs using multi-head attention.

In some implementations, the attention neural network layers are bidirectional. That is, for each node embedding in the node embeddings 202, each attention neural network layer generates an output corresponding to the node embedding by processing outputs generated by the previous attention neural network layer corresponding to every node embedding in the node embeddings 202.

In some other implementations, the attention neural network layers are uni-directional, or "masked." That is, for each particular node embedding in the node embeddings 202 and given an ordering of the node embeddings 202, each attention neural network layer generates an output corresponding to the node embedding by processing outputs generated by the previous attention neural network layer corresponding to the particular node embedding and previous node embeddings in the ordering of the node embeddings 202. In some implementations in which the graph is an undirected graph, the node embeddings 202 can be ordered according to a topological sorting of the nodes of the graph. A topological sorting of a graph with directed edges and no cycles is a linear ordering of the nodes of the graph such that for every directed edge between a first node and a second node, the first node is earlier in the ordering than the second node. In some other implementations, the node embeddings 202 can be ordered randomly.

In some such implementations, the attention neural network layers use a segment-level recurrence mechanism. That is, the node embeddings 202 are segmented into multiple segments, with each node embedding being assigned to a particular segment in a particular sequence of segments. For each segment and for each attention neural network layer, the output of the attention neural network layer corresponding to each node embedding in the segment can be cached, and those cached outputs can be used as inputs for the next attention neural network layer when the next attention neural network layer is generating outputs corresponding to node embeddings in the next segment in the sequence of segments. That is, for each particular node embedding, the input for the attention neural network layer can include i) the output generated by the previous attention neural network layer corresponding to the node embedding, ii) outputs generated by the previous attention neural network layer corresponding to previous node embeddings that are in the same segment, and iii) one or more cached outputs generated by the previous attention neural network layer corresponding to respective node embeddings in the previous segment in the sequence of segments.

In the implementations in which the policy neural network 200 generates a task output for a single execution optimization task, the output of the policy embedding subnetwork 210 can be the task output for the execution optimization task. That is, the policy neural network 200 only includes the policy embedding subnetwork 210. For example, the policy embedding subnetwork 210 can include the attention neural network layers described above and an output neural network layer that processes the output of the final attention neural network layer corresponding to the node embedding of a particular node in the graph and generates the decision for the execution optimization task for the operation represented by the particular node.

In the implementations in which the policy neural network 200 generates a task output for each of multiple execution optimization tasks, the output of the policy embedding subnetwork 210 can a first task embedding 212a. The policy neural network 200 can then generate each task output for the multiple execution optimization tasks in sequence. When generating the task output for a respective execution optimization task, the policy neural network 200 can use information about the task outputs for other execution optimization tasks that have already been generated.

In particular, the first task subnetwork 220a can process the first task embedding 212a to generate the first task output 222a corresponding to the first of the multiple execution optimization tasks. The first task subnetwork 220a can also generate a second task embedding 212b that includes information about the first task output 222a and the first task embedding 212a.

The second task subnetwork 220b can process the second task embedding 212b to generate the second task output 222b corresponding to the second of the multiple execution optimization tasks. The second task subnetwork 220b can also generate a third task embedding 212c that includes information about the second task output 222b and the second task embedding 212b.

The sequence can continue until the final task subnetwork 220m corresponding to the $m^{th}$ and final execution optimization task, which can process the task embedding generated by the previous task subnetwork to generate the $m^{th}$ task output 222m. The final task subnetwork 220m does not generate a task embedding, because there are not further tasks. Thus, the $i^{th}$ task subnetwork generates the $i^{th}$ task output using information from all of the previous task outputs by processing the $i^{th}$ task embedding, which was generated from the $(i-1)^{th}$ task output and the $(i-1)^{th}$ task embedding, which itself was generated from the $(i-2)^{th}$ task output and the $(i-2)^{th}$ task embedding, and so on.

In some implementations, the policy neural network 200 can be conditioned on features of the computational graph represented by the node embeddings 202. For example, the policy neural network 200 can have one or more conditioning neural network layers that combine i) the output of a previous neural network layer and ii) the node embeddings 202. As a particular example, the policy neural network 200 can compute an output $x^{(l+1)}$ of a dense neural network layer l using the following architecture:

$$x^{(l+1)}=g^{(l)}(c(x^{(0)})\odot x^{(l)}),$$

where $x^{(l)}$ is an input to the dense neural network layer l, $g^{(l)}$ characterizes operations of the dense neural network layer l, c is a feature conditioning neural network layer of the policy neural network, and $x^{(0)}$ is the node embeddings 202.

Conditioning one or more layers of the policy neural network 200 on features of the corresponding computational graph can allow the policy neural network 200 to generate execution optimization policies for neural networks that have very different architectures. For example, the policy neural network 200 can be trained to receive graphs of neural networks from a wide range of application domains, e.g., computer vision, natural language processing, and robotics. These neural networks can have drastically different architectures, can have different types of computational operations, data shapes, and network topologies, and can have vastly different numbers of operations ranging, e.g., between 1K and 10M. The conditioning neural network layers allow the policy neural network 200 to leverage information about the particular neural network in order to generate the execution optimization policy for the neural network.

Figure 3:
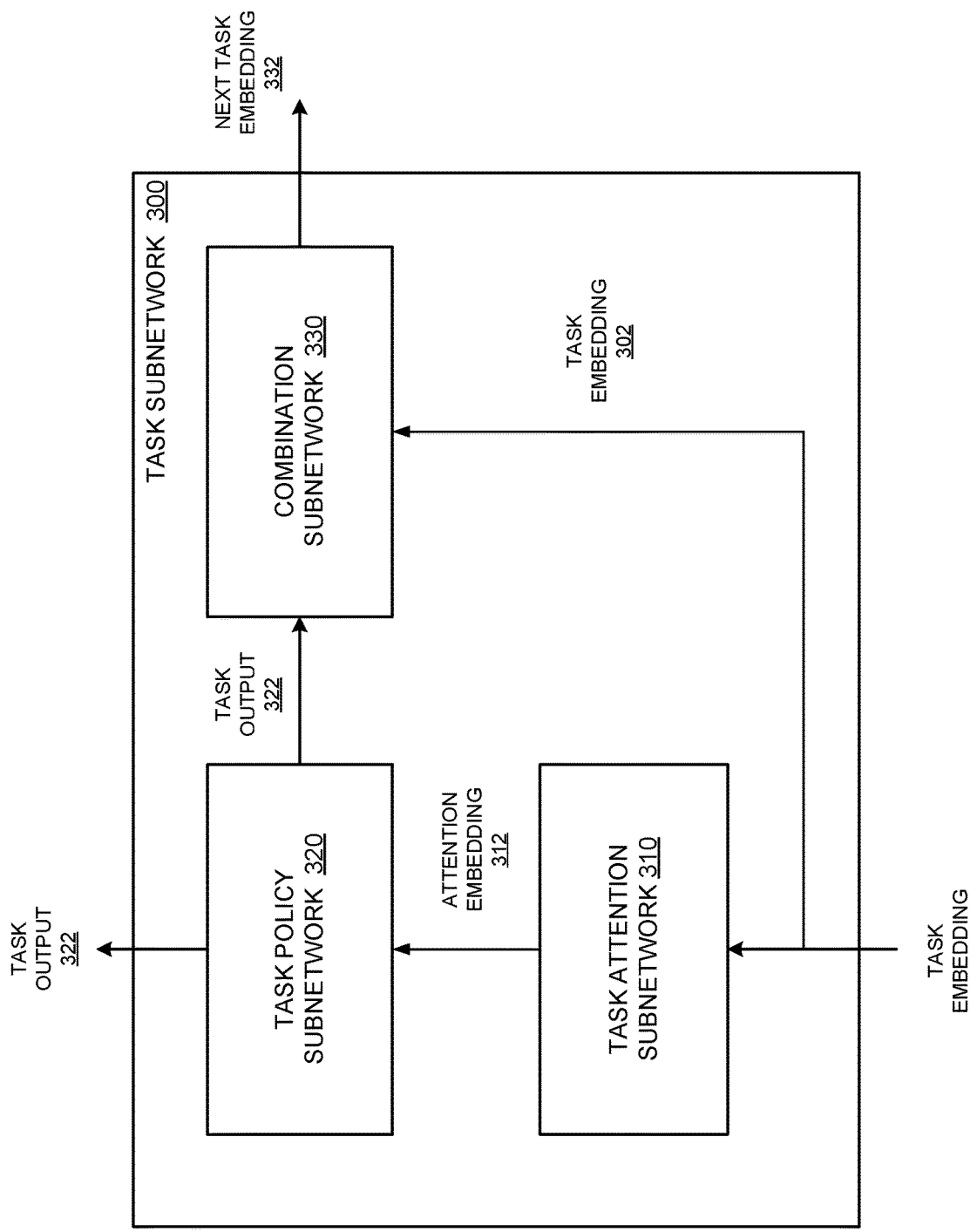
FIG. 3 is a diagram of an example task subnetwork.

FIG. 3 is a diagram of an example task subnetwork 300. The task subnetwork 300 is an example of a system implemented as computer programs on one or more computers in one or more locations, in which the systems, components, and techniques described below can be implemented.

The task subnetwork 300 receives a task embedding 302 corresponding to a particular execution optimization task, and generates a task output 322 for the particular execution optimization task. The task subnetwork 300 can also generate a next task embedding 332 that corresponds to a different execution optimization task and that can be provided to a different task subnetwork corresponding to the different execution optimization task. The task subnetwork 300 can be, for example, any of the task subnetworks 220a-c depicted in FIG. 2.

The task subnetwork 300 includes a task attention subnetwork 310 and a task policy subnetwork 320. The task attention subnetwork 310 can process the task embedding 302 to generate an attention embedding 312. The task attention subnetwork can include one or more attention neural network layers, e.g. attention neural network layers with a segment-level recurrence mechanism. The task policy subnetwork 320 can process the attention embedding 312 to generate the task output 322. The task policy subnetwork can include one or more fully-connected neural network layers.

The task subnetwork 300 can also include a combination subnetwork that combines the task output 322 and the task embedding 302 to generate the next task embedding 332. In some implementations, the combination subnetwork 330 can compute a sum of the task output 322 and the task embedding 302. In some such implementations, the combination subnetwork can also process the sum using layer normalization to generate the next task embedding 332. In some other implementations, the combination subnetwork 330 can combine the task embedding 302 and the task output 322 by processing the task embedding 302 and the task output 322 using one or more neural network layers.

In some such implementations, each task attention subnetwork 310 corresponding to a respective different execution optimization tasks in a policy neural network, e.g., the policy neural network 200 depicted in FIG. 2, can share parameters. Parameter sharing can allow for the policy neural network to account for dependencies between the multiple execution optimization tasks. As a particular example, each of the task attention subnetworks can include one or more of the same recurrent attention neural network layers. As another particular example, each of the task attention subnetworks can be the same subnetwork, i.e., have the same network architecture and parameter values. In some implementations, each task attention subnetwork 310 corresponding to a particular execution optimization tasks in a policy neural network can include residual connections with other task attention subnetworks corresponding to other execution optimization tasks. Residual connections can allow the policy neural network to further capture inter-task dependencies.

Figure 4:
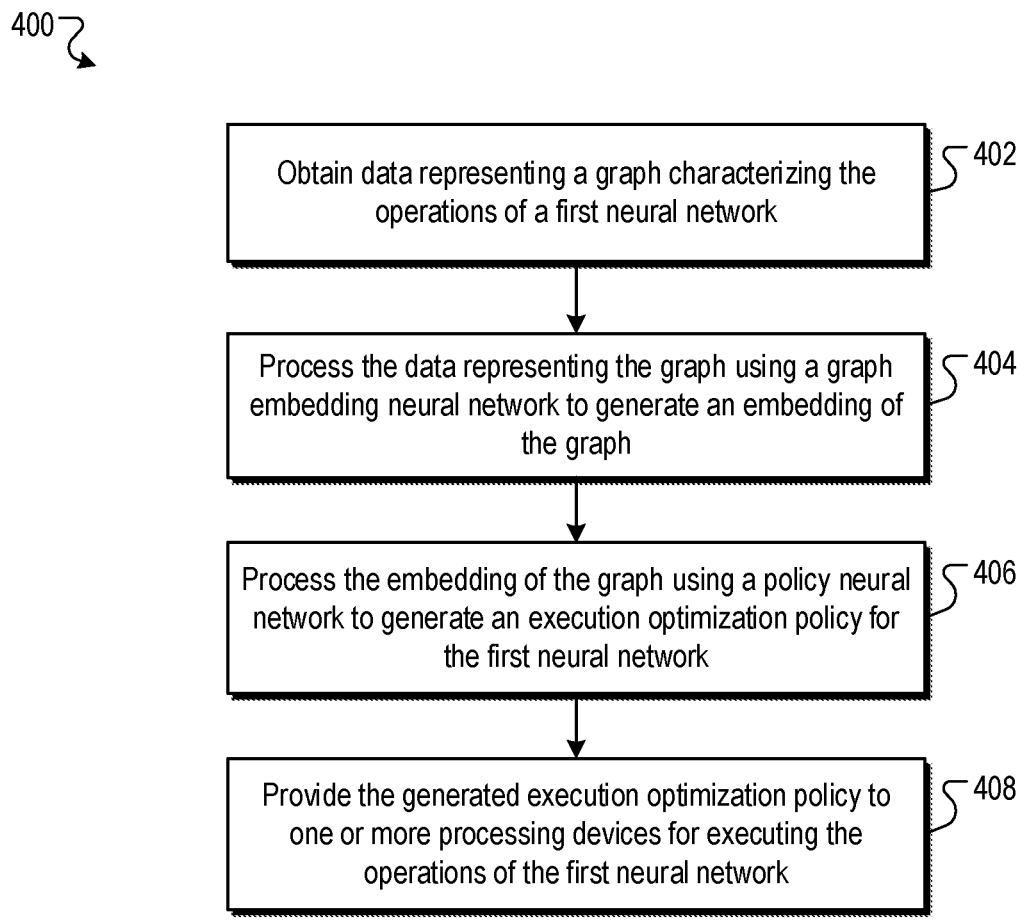
FIG. 4 is a flow diagram of an example process for generating an execution optimization policy.

FIG. 4 is a flow diagram of an example process 400 for generating an execution optimization policy. For convenience, the process 400 will be described as being performed by a system of one or more computers located in one or more locations. For example, a policy generation system, e.g., the policy generation system 100 depicted in FIG. 1, appropriately programmed in accordance with this specification, can perform the process 400.

The system obtains data representing a graph characterizing the operations of a first neural network (step 402). The data can be generated by a graph representation subsystem, e.g., the graph representation subsystem 110 depicted in FIG. 1. The data can include a respective initial node embedding for each node in the graph, where each node in the graph represents a different operation of the first neural network.

The system processes the data representing the graph using a graph embedding neural network to generate an embedding of the graph (step 404). The embedding of the graph can include a respective updated node embedding for each node in the graph that was generated over multiple embedding time steps.

The system processes the embedding of the graph using a policy neural network to generate an execution optimization policy for the first neural network (step 406). The execution optimization policy can include one or more task outputs, where each task output corresponds to a particular execution optimization task and includes, for each operation of the first neural network, a respective decision for the particular execution optimization task. The policy neural network can generate the one or more task outputs by processing the embedding of the graph using multiple attention neural network layers with a segment-level recurrence mechanism. In the implementations where the policy neural network generates multiple task outputs, the policy neural network can generate each task output in sequence using a sequence of task subnetworks.

The system provides the generated execution optimization policy to one or more processing devices (step 408). The processing devices can use the generated execution optimization policy to execute the operations of the first neural network.

Figure 5:
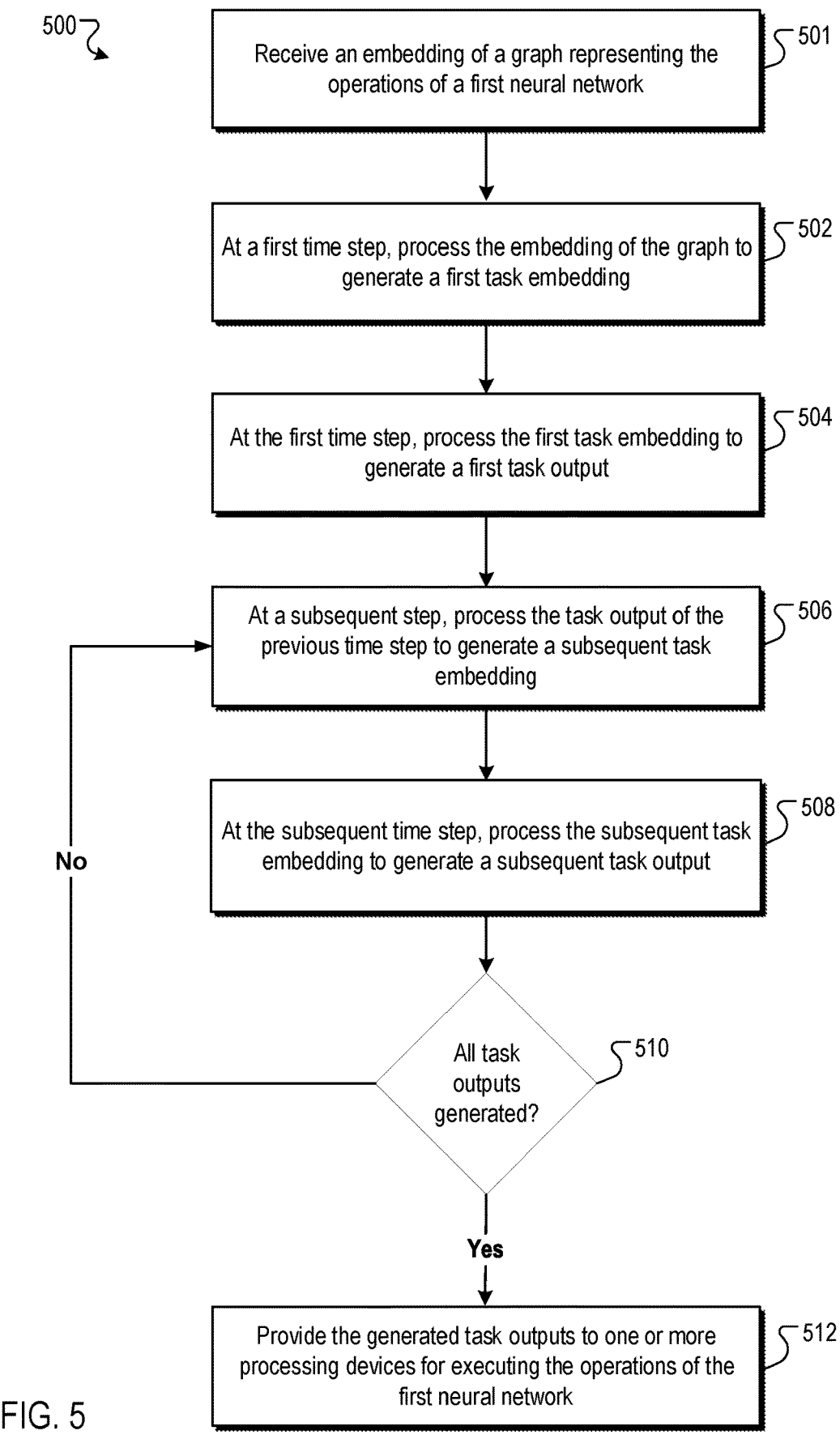
FIG. 5 is a flow diagram of an example process for generating multiple task outputs.

FIG. 5 is a flow diagram of an example process 500 for generating multiple task outputs. Each task output corresponds to a different execution optimization task of multiple execution optimization tasks. For convenience, the process 500 will be described as being performed by a system of one or more computers located in one or more locations. For example, a policy neural network, e.g., the policy neural network 200 depicted in FIG. 2, appropriately programmed in accordance with this specification, can perform the process 500.

The system receives an embedding of a graph representing the operations of a first neural network (step 501). The embedding of the graph might have been generated by a graph embedding neural network, e.g., the graph embedding neural network 120 depicted in FIG. 1.

At a first time step, the system processes the embedding of the graph to generate a first task embedding (step 502). The first time step and the first task embedding can correspond to a first execution optimization task of the multiple execution optimization tasks. For example, the system can process the embedding of the graph using a policy embedding subnetwork, e.g., the policy embedding subnetwork 210 depicted in FIG. 2.

At the first time step, the system processes the first task embedding to generate a first task output (step 504). The first task output includes a respective decision for each operation of the first neural network for the first execution optimization task. For example, the system can process the first task embedding using a task subnetwork corresponding to the first execution optimization task, e.g., the first task subnetwork 220a of the policy neural network 200 depicted in FIG. 2.

At a subsequent time step, the system processes the first task output of the first time step to generate a subsequent task embedding (step 506). The subsequent time step and the subsequent task embedding can correspond to a subsequent execution optimization task that is different than the first execution optimization task. For example, the system can combine the first task output with the first task embedding to generate the subsequent task embedding using a combination subnetwork, e.g., the combination subnetwork 330 depicted in FIG. 3.

At the subsequent time step, the system processes the subsequent task embedding to generate a subsequent task output (step 508). The subsequent task output includes a respective decision for each operation of the first neural network for the subsequent execution optimization task.

The system determines if all task outputs have been generated (step 510). That is, the system determines if a task output has been generated for each of the multiple execution optimization tasks, and thus that the execution optimization policy for the first neural network is fully generated.

If all the task outputs have not been generated at step 510, the system returns to step 506. That is, at another subsequent time step corresponding to a different execution optimization task for which a task output has not been generated, the system processes the task output of the previous time step to generate a subsequent task embedding for the different execution optimization task, and then processes the subsequent task output to generate a subsequent task output for the different execution optimization task.

If all the task output have been generated at step 510, then the system provides the generated task outputs to one or more processing devices for executing the operations of the first neural network (step 512).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method of generating a task output for executing a plurality of operations of a neural network on one or more processing devices, wherein the task output comprises, for each of the plurality of operations of the neural network, a respective decision for a particular optimization task, the method comprising:

obtaining data representing a graph characterizing the plurality of operations of the neural network, wherein each node of the graph characterizes an operation of the neural network and each edge of the graph characterizes data dependency between the operations;

processing the data representing the graph using a graph embedding neural network to generate an embedding of the graph; and processing the embedding of the graph using a policy neural network to generate the task output.

Embodiment 2 is the method of embodiment 1, wherein the embedding of the graph comprises a respective node embedding of each node of the graph.

Embodiment 3 is the method of embodiment 2, wherein processing the data representing the graph using the graph embedding neural network comprises, at each of a plurality of embedding time steps:

receiving a current embedding of each node of the graph generated during a previous embedding time step;

combining, for each particular node of the graph, the respective current embedding of each neighboring node of the particular node to generate a neighborhood embedding of the particular node; and combining, for each node of the graph, the current embedding of the node and the neighborhood embedding of the node to generate a new embedding of the node.

Embodiment 4 is the method of embodiment 3, wherein processing the data representing the graph using the graph embedding neural network further comprises, at a first embedding time step:

generating an initial embedding for each node of the graph using features of the node, wherein the features comprise one or more of:

an operation type of the operation characterized by the node, an output shape of an output of the operation characterized by the node, or a respective identification for each neighboring node of the node.

Embodiment 5 is the method of any one of embodiments 3 or 4, wherein combining the current embedding of a particular node and the neighborhood embedding of the particular node comprises:

concatenating the current embedding of the particular node and the neighborhood embedding of the particular node to generate a combined embedding of the particular node; and processing the combined embedding of the particular node using one or more fully-connected neural network layers to generate the new embedding of the particular node.

Embodiment 6 is the method of any one of embodiments 3-5, wherein combining the respective embedding of each neighboring node of a particular node comprises:

processing, for each neighboring node of the particular node, the current embedding of the neighboring node using an affine transformation to generate a processed embedding for the neighboring node;

processing, for each neighboring node of the particular node, the processed embedding of the neighboring node using a sigmoid activation function to generate an activation embedding for the neighboring node; and combining the respective activation embedding of each neighboring node of the particular node by processing the activation embeddings using a max pooling layer.

Embodiment 7 is the method of any one of embodiments 1-6, wherein the particular optimization task is one of:

a device placement task, wherein each of the plurality of operations of the neural network is assigned a particular processing device of the one or more processing devices;

an operation scheduling task, wherein each of the plurality of operations of the neural network is assigned a priority, and wherein each processing device comprises a priority-based scheduler that maintains a priority queue of the operations assigned to the processing device; or an operation fusion task, wherein a plurality of selected operations of the neural network are determined to be executed as if the selected operations were a single operation.

Embodiment 8 is the method of any one of embodiments 1-7, wherein the graph embedding neural network and the policy neural network have been trained end-to-end by updating parameters θ of the neural network using an objective function that characterizes an expected runtime of respective operations characterized by each of a plurality of candidate graphs.

Embodiment 9 is the method of embodiment 8, wherein the objective function is:

$$J(\theta) = E_{G \sim \mathcal{G}, T \sim \pi_\theta(G)}[r_{G,T}] \approx \frac{1}{N}\sum_G E_{T \sim \pi_\theta(G)}[r_{G,T}],$$

where G is a candidate graph, $\mathcal{G}$ is a space of candidate graphs, T is a task output for the particular optimization task, $\pi_\theta(G)$ is a policy for the candidate graph G under the parameters θ, and $r_{G,T}$ is a reward that is a function of the runtime of the operations characterized by the candidate graph G using the task output T.

Embodiment 10 is the method of any one of embodiments 8-9, wherein the graph embedding neural network and the policy neural network have been trained by optimizing the objective function using Proximal Policy Optimization.

Embodiment 11 is the method of any one of embodiments 1-10, wherein the policy neural network is conditioned on features of the graph.

Embodiment 12 is the method of embodiment 11, wherein conditioning the policy neural network on features of the graph comprises computing an output x^((l+1)) of a neural network layer l of the policy neural network:

$$x^{(l+1)} = g^{(l)}(c(x^{(0)}) \odot x^{(l)}),$$

where $x^{(l)}$ is an input to the neural network layer l, $g^{(l)}$ characterizes operations of the neural network layer l, c is a feature conditioning neural network layer of the policy neural network, and $x^{(0)}$ is the embedding of the graph generated by the graph embedding neural network.

Embodiment 13 is the method of any one of embodiments 1-12, wherein the method further comprises executing the plurality of operations of the neural network on the one or more processing devices using the generated task output.

Embodiment 14 is the method of any one of embodiments 1-13, wherein the policy neural network comprises a plurality of attention neural network layers.

Embodiment 15 is the method of embodiment 14, wherein the plurality of attention neural network layers comprises segment-level recurrence mechanism.

Embodiment 16 is the method of any one of embodiments 1-15, wherein the method further comprises generating a respective task output for each of a plurality of optimization tasks, wherein each task output comprises, for each of the plurality of operations of the neural network, a respective decision for the corresponding optimization task, and wherein processing the embedding of the graph using a policy neural network comprises:

at a first time step corresponding to a first optimization task of the plurality of optimization tasks:

generating a first task embedding from the embedding of the graph; and processing the first task embedding using the policy neural network to generate a first task output for the first optimization task; and at each of one or more subsequent time steps each corresponding to a respective optimization task of the plurality of optimization tasks:

processing the task output of a previous time step to generate a subsequent task embedding; and processing the subsequent task embedding using the policy neural network to generate a subsequent task output for the corresponding optimization task.

Embodiment 17 is the method of embodiment 16, wherein processing the task output of a previous time step comprises combining the task embedding of the previous time step and the task output of the previous time step to generate the subsequent task embedding.

Embodiment 18 is the method of embodiment 17, wherein combining the task embedding of the previous time step and the task output of the previous time step to generate a subsequent task embedding comprises:

computing a sum of the task embedding and the task output of the previous time step to generate a summed representation; and processing the summed representation using layer normalization to generate the subsequent task embedding.

Embodiment 19 is the method of any one of embodiments 16-18, wherein:

the policy neural network comprises a policy embedding subnetwork comprising a plurality of attention neural network layers; and generating the first task embedding from the embedding of the graph comprises processing the embedding of the graph using the policy embedding subnetwork.

Embodiment 20 is the method of any one of embodiments 16-19, wherein the policy neural network comprises:

a respective task attention subnetwork for each of the plurality of optimization tasks, wherein each task attention subnetwork comprises one or more attention neural network layers; and a respective task policy subnetwork for each of the plurality of optimization tasks, wherein processing a task embedding for a particular optimization task using the policy neural network comprises:

processing the task embedding using the task attention subnetwork corresponding to the particular optimization task to generate an attention embedding; and processing the attention embedding using the task policy subnetwork corresponding to the particular optimization task to generate the task output for the particular optimization task.

Embodiment 21 is the method of embodiment 20, wherein the task attention subnetworks of each of the plurality of optimization tasks share a plurality of parameters.

Embodiment 22 is the method of any one of embodiments 20-21, wherein the respective task attention subnetwork corresponding to each optimization task shares one or more residual connections with each of one or more other task attention subnetworks corresponding to other optimization tasks.

Embodiment 23 is a method of generating an optimization policy for executing a plurality of operations of a neural network on one or more processing devices, wherein:

the optimization policy comprises a task output for each of a plurality of optimization tasks, and each task output comprises, for each of the plurality of operations of the neural network, a respective decision for the corresponding optimization task, the method comprising:

obtaining data representing a graph characterizing the plurality of operations of the neural network, wherein each node of the graph characterizes an operation of the neural network and each edge of the graph characterizes data dependency between the operations;

processing the data representing the graph using a graph embedding neural network to generate an embedding of the graph; and processing the embedding of the graph using a policy neural network to generate the respective task output for each of the plurality of optimization tasks, the processing comprising:

at a first time step corresponding to a first optimization task of the plurality of optimization tasks:

generating a first task embedding from the embedding of the graph; and processing the first task embedding using the policy neural network to generate a first task output for the first optimization task; and at each of one or more subsequent time steps each corresponding to a respective optimization task of the plurality of optimization tasks:

processing the task output of a previous time step to generate a subsequent task embedding; and processing the subsequent task embedding using the policy neural network to generate a subsequent task output for the corresponding optimization task.

Embodiment 24 is the method of embodiment 23, wherein processing the task output of a previous time step comprises combining the task embedding of the previous time step and the task output of the previous time step to generate the subsequent task embedding.

Embodiment 25 is the method of embodiment 24, wherein combining the task embedding of the previous time step and the task output of the previous time step to generate a subsequent task embedding comprises:

computing a sum of the task embedding and the task output of the previous time step to generate a summed representation; and processing the summed representation using layer normalization to generate the subsequent task embedding.

Embodiment 26 is the method of any one of embodiments 23-25, wherein the embedding of the graph comprises a respective node embedding of each node of the graph.

Embodiment 27 is the method of any embodiment 26, wherein processing the data representing the graph using the graph embedding neural network comprises, at each of a plurality of embedding time steps:

receiving a current embedding of each node of the graph generated during a previous embedding time step;

combining, for each particular node of the graph, the respective current embedding of each neighboring node of the particular node to generate a neighborhood embedding of the particular node; and combining, for each node of the graph, the current embedding of the node and the neighborhood embedding of the node to generate a new embedding of the node.

Embodiment 28 is the method of embodiment 27, wherein processing the data representing the graph using the graph embedding neural network further comprises, at a first embedding time step:

generating an initial embedding for each node of the graph using features of the node, wherein the features comprise one or more of:
  an operation type of the operation characterized by the node,
  an output shape of an output of the operation characterized by the node, or
  a respective identification for each neighboring node of the node.

Embodiment 29 is the method of any one of embodiments 27-28, wherein combining the current embedding of a particular node and the neighborhood embedding of the particular node comprises:
  concatenating the current embedding of the particular node and the neighborhood embedding of the particular node to generate a combined embedding of the particular node; and
  processing the combined embedding of the particular node using one or more fully-connected neural network layers to generate the new embedding of the particular node.

Embodiment 30 is the method of any one of embodiments 27-29, wherein combining the respective embedding of each neighboring node of a particular node comprises:
  processing, for each neighboring node of the particular node, the current embedding of the neighboring node using an affine transformation to generate a processed embedding for the neighboring node;
  processing, for each neighboring node of the particular node, the processed embedding of the neighboring node using a sigmoid activation function to generate an activation embedding for the neighboring node; and
  combining the respective activation embedding of each neighboring node of the particular node by processing the activation embeddings using a max pooling layer.

Embodiment 31 is the method of any one of embodiments 23-30, wherein the plurality of optimization tasks comprises one or more of:
  a device placement task, wherein each of the plurality of operations of the neural network is assigned a particular processing device of the one or more processing devices;
  an operation scheduling task, wherein each of the plurality of operations of the neural network is assigned a priority, and wherein each processing device comprises a priority-based scheduler that maintains a priority queue of the operations assigned to the processing device; or
  an operation fusion task, wherein a plurality of selected operations of the neural network are determined to be executed as if the selected operations were a single operation.

Embodiment 32 is the method of any one of embodiments 23-31, wherein the graph embedding neural network and the policy neural network have been trained end-to-end by updating parameters θ of the neural network using an objective function that characterizes an expected runtime of respective operations characterized by each of a plurality of candidate graphs.

Embodiments 33 is the method of embodiment 32, wherein the objective function is:

$$J(\theta) = E_{G \sim \mathcal{G}, T \sim \pi_\theta(G)}[r_{G,T}] \approx \frac{1}{N} \sum_G E_{T \sim \pi_\theta(G)}[r_{G,T}],$$

where G is a candidate graph, $\mathcal{G}$ is a space of candidate graphs, T is a task output for a particular optimization task $\mathcal{T}$ of the plurality of optimization tasks, $\pi_\theta(G)$ is a policy for the candidate graph G under the parameters θ, and $r_{G,T}$ is a reward that is a function of the runtime of the operations characterized by the candidate graph G using the task output T.

Embodiment 34 is the method of any one of embodiments 32-33, wherein the graph embedding neural network and the policy neural network have been trained by optimizing the objective function using Proximal Policy Optimization.

Embodiment 35 is the method of any one of embodiments 23-34, wherein the policy neural network is conditioned on features of the graph.

Embodiment 36 is the method of embodiment 35, wherein conditioning the policy neural network on features of the graph comprises computing an output $x^{(l+1)}$ of a neural network layer l of the policy neural network:

$$x^{(l+1)} = g^{(l)}(c(x^{(0)}) \odot x^{(l)}),$$

where $x^{(l)}$ is an input to the neural network layer l, $g^{(l)}$ characterizes operations of the neural network layer l, c is a feature conditioning neural network layer of the policy neural network, and $x^{(0)}$ is the embedding of the graph generated by the graph embedding neural network.

Embodiment 37 is the method of any one of embodiments 23-36, further comprising:
  executing the plurality of operations of the neural network on the one or more processing devices using the generated optimization policy.

Embodiment 38 is the method of any one of embodiments 23-37, wherein:
  the policy neural network comprises a policy embedding subnetwork comprising a plurality of recurrent attention neural network layers; and
  generating the first task embedding from the embedding of the graph comprises processing the embedding of the graph using the policy embedding subnetwork.

Embodiment 39 is the method of any one of embodiments 23-38, wherein the policy neural network comprises:
  a respective task attention subnetwork for each of the plurality of optimization tasks, wherein each task attention subnetwork comprises one or more attention neural network layers; and
  a respective task policy subnetwork for each of the plurality of optimization tasks,
  wherein processing a task embedding for a particular optimization task using the policy neural network comprises:
  processing the task embedding using the task attention subnetwork corresponding to the particular optimization task to generate an attention embedding; and
  processing the attention embedding using the task policy subnetwork corresponding to the particular optimization task to generate the task output for the particular optimization task.

Embodiment 40 is the method of embodiment 39, wherein the task attention subnetworks of each of the plurality of optimization tasks share a plurality of parameters.

Embodiment 41 is the method of any one of embodiments 39-40, wherein the respective task attention subnetwork corresponding to each optimization task shares one or more residual connections with each of one or more other task attention subnetworks corresponding to other optimization tasks.

Embodiment 42 is a system comprising: one or more computers and one or more storage devices storing instructions that are operable, when executed by the one or more computers, to cause the one or more computers to perform the method of any one of embodiments 1 to 41.

Embodiment 43 is a computer storage medium encoded with a computer program, the program comprising instructions that are operable, when executed by data processing apparatus, to cause the data processing apparatus to perform the method of any one of embodiments 1 to 41.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of generating a task output for executing a plurality of operations of a neural network on one or more processing devices, wherein the task output comprises, for each of the plurality of operations of the neural network, a respective decision for a particular optimization task, the method comprising:
    obtaining data representing a graph characterizing the plurality of operations of the neural network, wherein each node of the graph characterizes an operation of the neural network and each edge of the graph characterizes data dependency between the operations;
    processing the data representing the graph using a graph embedding neural network to generate an embedding of the graph; and
    processing the embedding of the graph using a policy neural network to generate the task output, wherein the policy neural network is conditioned on features of the graph.

2. The method of claim 1, wherein the embedding of the graph comprises a respective node embedding of each node of the graph.

3. The method of claim 2, wherein processing the data representing the graph using the graph embedding neural network comprises, at each of a plurality of embedding time steps:
    receiving a current embedding of each node of the graph generated during a previous embedding time step;
    combining, for each particular node of the graph, the respective current embedding of each neighboring node of the particular node to generate a neighborhood embedding of the particular node; and
    combining, for each node of the graph, the current embedding of the node and the neighborhood embedding of the node to generate a new embedding of the node.

4. The method of claim 3, wherein processing the data representing the graph using the graph embedding neural network further comprises, at a first embedding time step:
    generating an initial embedding for each node of the graph using features of the node, wherein the features comprise one or more of:
        an operation type of the operation characterized by the node,
        an output shape of an output of the operation characterized by the node, or
        a respective identification for each neighboring node of the node.

5. The method of claim 3, wherein combining the current embedding of a particular node and the neighborhood embedding of the particular node comprises:
    concatenating the current embedding of the particular node and the neighborhood embedding of the particular node to generate a combined embedding of the particular node; and
    processing the combined embedding of the particular node using one or more fully-connected neural network layers to generate the new embedding of the particular node.

6. The method of claim 3, wherein combining the respective embedding of each neighboring node of a particular node comprises:
    processing, for each neighboring node of the particular node, the current embedding of the neighboring node using an affine transformation to generate a processed embedding for the neighboring node;
    processing, for each neighboring node of the particular node, the processed embedding of the neighboring node using a sigmoid activation function to generate an activation embedding for the neighboring node; and
    combining the respective activation embedding of each neighboring node of the particular node by processing the activation embeddings using a max pooling layer.

7. The method of claim 1, wherein the particular optimization task is one of:
    a device placement task, wherein each of the plurality of operations of the neural network is assigned a particular processing device of the one or more processing devices;
    an operation scheduling task, wherein each of the plurality of operations of the neural network is assigned a priority, and wherein each processing device comprises a priority-based scheduler that maintains a priority queue of the operations assigned to the processing device; or
    an operation fusion task, wherein a plurality of selected operations of the neural network are determined to be executed as if the selected operations were a single operation.

8. The method of claim 1, wherein the graph embedding neural network and the policy neural network have been trained end-to-end by updating parameters of the neural network using an objective function that characterizes an expected runtime of respective operations characterized by each of a plurality of candidate graphs.

9. The method of claim 8, wherein the objective function is:

$$J(\theta) = E_{G \sim \mathcal{G}, T \sim \pi_\theta(G)}[r_{G,T}] \approx \frac{1}{N} \sum_G E_{T \sim \pi_\theta(G)}[r_{G,T}],$$

where G is a candidate graph, $\mathcal{G}$ is a space of candidate graphs, T is a task output for the particular optimization task, $\pi_\theta(G)$ is a policy for the candidate graph G under the parameters $\theta$, and $r_{G,T}$ is a reward that is a function of the runtime of the operations characterized by the candidate graph G using the task output T.

10. The method of claim 8, wherein the graph embedding neural network and the policy neural network have been trained by optimizing the objective function using Proximal Policy Optimization.

11. The method of claim 1, wherein conditioning the policy neural network on features of the graph comprises computing an output $x^{(l+1)}$ of a neural network layer l of the policy neural network:

$$x^{(l+1)} = g^{(l)}(c(x^{(0)}) \odot x^{(l)}),$$

where $x^{(l)}$ is an input to the neural network layer l, $g^{(l)}$ characterizes operations of the neural network layer l, c is a feature conditioning neural network layer of the policy neural network, and $x^{(0)}$ is the embedding of the graph generated by the graph embedding neural network.

12. The method of claim 1, further comprising:
executing the plurality of operations of the neural network on the one or more processing devices using the generated task output.

13. The method of claim 1, wherein the policy neural network comprises a plurality of attention neural network layers.

14. The method of claim 13, wherein the plurality of attention neural network layers comprises a segment-level recurrence mechanism.

15. The method of claim 1, wherein the method further comprises generating a respective task output for each of a plurality of optimization tasks, wherein each task output comprises, for each of the plurality of operations of the neural network, a respective decision for the corresponding optimization task, and wherein processing the embedding of the graph using a policy neural network comprises:
at a first time step corresponding to a first optimization task of the plurality of optimization tasks:
generating a first task embedding from the embedding of the graph; and
processing the first task embedding using the policy neural network to generate a first task output for the first optimization task; and
at each of one or more subsequent time steps each corresponding to a respective optimization task of the plurality of optimization tasks:
processing the task output of a previous time step to generate a subsequent task embedding; and
processing the subsequent task embedding using the policy neural network to generate a subsequent task output for the corresponding optimization task.

16. The method of claim 15, wherein processing the task output of a previous time step comprises combining the task embedding of the previous time step and the task output of the previous time step to generate the subsequent task embedding.

17. The method of claim 16, wherein combining the task embedding of the previous time step and the task output of the previous time step to generate a subsequent task embedding comprises:
computing a sum of the task embedding and the task output of the previous time step to generate a summed representation; and
processing the summed representation using layer normalization to generate the subsequent task embedding.

18. The method of claim 15, wherein:
the policy neural network comprises a policy embedding subnetwork comprising a plurality of attention neural network layers; and
generating the first task embedding from the embedding of the graph comprises processing the embedding of the graph using the policy embedding subnetwork.

19. The method of claim 15, wherein the policy neural network comprises:
a respective task attention subnetwork for each of the plurality of optimization tasks, wherein each task attention subnetwork comprises one or more attention neural network layers; and
a respective task policy subnetwork for each of the plurality of optimization tasks,
wherein processing a task embedding for a particular optimization task using the policy neural network comprises:
processing the task embedding using the task attention subnetwork corresponding to the particular optimization task to generate an attention embedding; and
processing the attention embedding using the task policy subnetwork corresponding to the particular optimization task to generate the task output for the particular optimization task.

20. The method of claim 19, wherein the task attention subnetworks of each of the plurality of optimization tasks share a plurality of parameters.

21. The method of claim 19, wherein the respective task attention subnetwork corresponding to each optimization task shares one or more residual connections with each of one or more other task attention subnetworks corresponding to other optimization tasks.

22. A system comprising one or more computers and one or more storage devices storing instructions that are operable, when executed by the one or more computers, to cause the one or more computers to perform operations for generating a task output for executing a plurality of operations of a neural network on one or more processing devices, wherein the task output comprises, for each of the plurality of operations of the neural network, a respective decision for a particular optimization task, the operations comprising:
obtaining data representing a graph characterizing the plurality of operations of the neural network, wherein each node of the graph characterizes an operation of the neural network and each edge of the graph characterizes data dependency between the operations;
processing the data representing the graph using a graph embedding neural network to generate an embedding of the graph; and processing the embedding of the graph using a policy neural network to generate the task output, wherein the policy neural network is conditioned on features of the graph.

23. A non-transitory computer storage medium encoded with a computer program, the program comprising instructions that are operable, when executed by a data processing apparatus, to cause the data processing apparatus to perform operations for generating a task output for executing a plurality of operations of a neural network on one or more processing devices, wherein the task output comprises, for each of the plurality of operations of the neural network, a respective decision for a particular optimization task, the operations comprising:

obtaining data representing a graph characterizing the plurality of operations of the neural network, wherein each node of the graph characterizes an operation of the neural network and each edge of the graph characterizes data dependency between the operations;

processing the data representing the graph using a graph embedding neural network to generate an embedding of the graph; and processing the embedding of the graph using a policy neural network to generate the task output, wherein the policy neural network is conditioned on features of the graph.

24. The system of claim 22, wherein the particular optimization task is one of:

a device placement task, wherein each of the plurality of operations of the neural network is assigned a particular processing device of the one or more processing devices;

an operation scheduling task, wherein each of the plurality of operations of the neural network is assigned a priority, and wherein each processing device comprises a priority-based scheduler that maintains a priority queue of the operations assigned to the processing device; or an operation fusion task, wherein a plurality of selected operations of the neural network are determined to be executed as if the selected operations were a single operation.

\* \* \* \* \*